Figure 1:
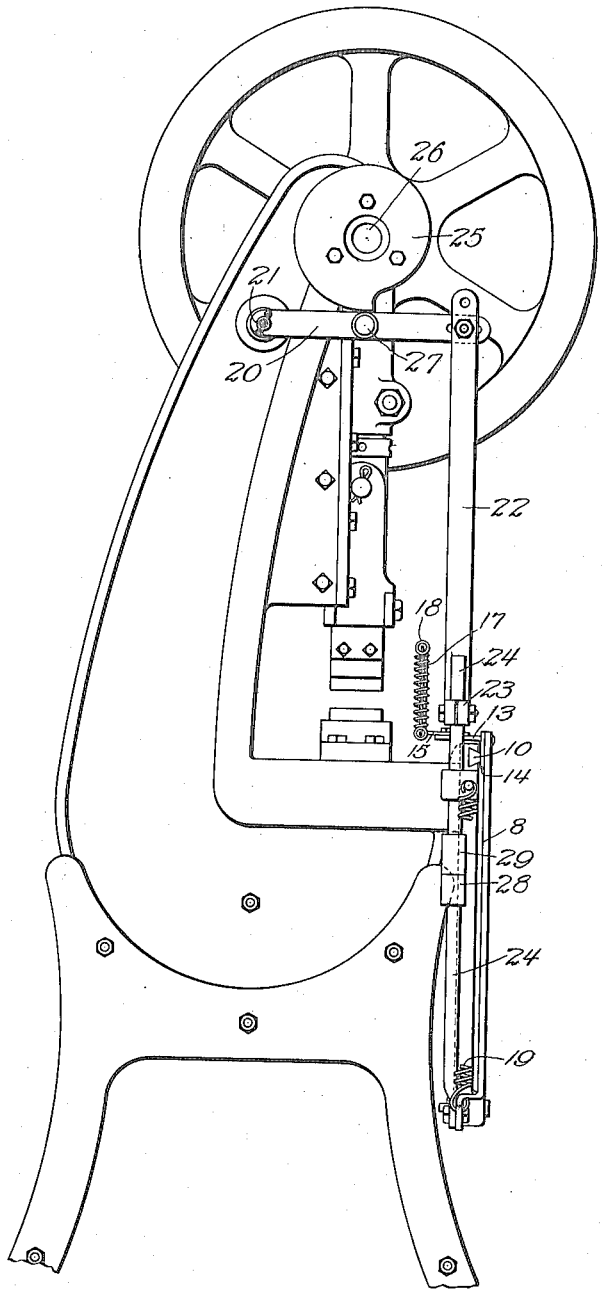

K. THULANDER.
SAFETY DEVICE FOR STAMPING MACHINES, &c.
APPLICATION FILED DEC. 19, 1912.

1,133,199.

Patented Mar. 23, 1915.
2 SHEETS—SHEET 1.

Witnesses:
Robert H. Weir
H. F. Tutt

Inventor
Konstantine Thulander
by Luther L. Miller
Atty.

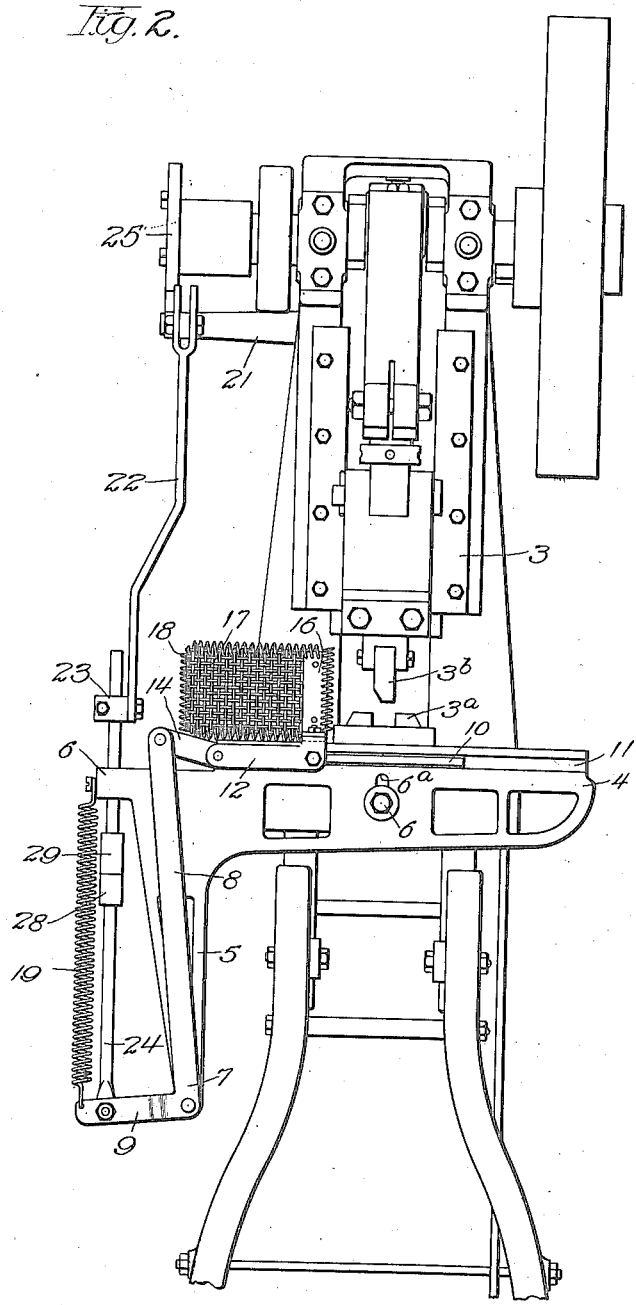

UNITED STATES PATENT OFFICE.

KONSTANTINE THULANDER, OF ROCKFORD, ILLINOIS, ASSIGNOR TO NATIONAL LOCK COMPANY, OF ROCKFORD, ILLINOIS, A CORPORATION OF ILLINOIS.

SAFETY DEVICE FOR STAMPING-MACHINES, &c.

1,133,199. Specification of Letters Patent. Patented Mar. 23, 1915.

Application filed December 19, 1912. Serial No. 737,639.

*To all whom it may concern:*

Be it known that I, KONSTANTINE THULANDER, a subject of the King of Sweden, residing at Rockford, in the county of Winnebago and State of Illinois, have invented certain new and useful Improvements in Safety Devices for Stamping-Machines, &c., of which the following is a specification.

One object of the invention is to provide a safety device, the operation of which is independent of the action of the operator and which does not increase the effort required of the operator. Prior safety devices have been connected with the treadle by which the operator causes the stamping parts to act. In my invention the operation of the safety device is automatic, and power is derived from the main shaft.

A further object is to provide a safety gate that will be effective when the machine is being run continuously as well as when operated intermittently at the will of the operator.

A further object is to provide a safety device which remains out of the way of the operator except at the moment when it is required and then moves instantaneously to brush the operator's hand out of the way and interposes the gate between the operator's hand and the stamping parts so long as the danger exists.

A further object is to provide a safety gate with few and simple operating parts, and little liable to wear or to get out of order.

In the accompanying drawings Figure 1 is a side elevation of a stamping machine showing one embodiment of my invention. Fig. 2 is a front elevation of the same.

In the drawings, 3 is a stamping machine or punch press of ordinary construction, and 3$^a$ and 3$^b$ are the coacting operating stamping members of the same. Rigidly attached to the front of the machine 3 by a bolt 6 extending through a slot 6$^a$ and extending in a lateral direction is a bracket frame 4 having a downwardly extending arm 5 and a vertically perforated lug 6. Pivotally mounted at the lower extremity of the arm 5 is a bell-crank 7 having arms 8 and 9.

A slide 10 is adapted to reciprocate horizontally in an undercut groove 11 in the bracket frame 4. Rigidly attached to the slide 10 is a bracket having arms 12 and 13, the arm 12 being connected by a link 14 with the arm 8 of the bell crank 7. On the bracket arm 13 is mounted a bracket having a horizontal arm 15 and a vertical arm 16. Rigidly attached to the arm 16 is a safety gate composed of a rigid grating 17 surrounded by a flexible coil 18.

A coiled spring 19 connects the arm 9 of the bell-crank 7 with the lug 6, and tends to raise the said arm 9, and thus by means of the arm 8 and the link 14 to move the safety gate 16 across the base of the stamping machine 3 and in front of the operating parts 3$^a$ and 3$^b$.

A lever 20 mounted at one end thereof on a projecting pivot 21 is pivotally connected at its opposite end with a link 22 which is pivotally connected at its lower end with a block 23 adapted to be clamped at a desired height on a reciprocating rod 24 which passes through the vertical orifice in the lug 6, and is pivotally connected with the arm 9 of the bell crank 7. A cam 25 rigidly mounted on a drive shaft 26 of the stamping machine 3 is adapted, through contact with a roller stud 27, to hold the lever 20 in a depressed position during the greater part of each revolution of the shaft 26 and to release it at a desired point in the revolution of said shaft. A block 28 fixed on the reciprocating rod 24 and having an elastic buffer 29 limits the upward movement of the rod 24 by contact with the lug 6, and through its connections limits the lateral movement of the safety gate 17.

In use, the lever 20 is normally held in a depressed position and through its connections holds the safety gate 17 out of the way of the operator while he is adjusting the work on the machine. During this period, the spring 19 is under tension between its fixed connection on the lug 6 and the arm 9. The cam wheel 25 is so adjusted with relation to the shaft 26 that just prior to the downward stroke of the reciprocating stamp 3$^b$ the stud 27 is released by the cam and the tension of the spring 19 lifts the arm 9 and through its connections with the slide 10 throws the safety gate to the right, brushing the hands of the operator out of the way of the descending stamp. The block 28 with its buffer 29 coming in contact with the lug 6 arrests the movement of the bell crank arm 9 and its connections, and stops the safety gate immediately in front of the stamping members, keeping the hand of the operator away from the stamping members during the period of danger. When the downward stroke is completed, the continued revolution of the shaft 26, rotating the cam 25, depresses the lever 20 and holds it in a depressed position during the greater part of its revolution, until it is again released for the operation of the gate by the spring 19, as before.

My invention is not limited to the precise form shown, as the proportions, form and manner of construction may be varied without departing from the spirit and substance of the invention.

Having thus described my invention, I claim:

1. In a machine having a dangerous part intermittently operating, a vertically disposed rigidly constructed safety gate horizontally reciprocating in a substantially straight line and adapted to be interposed between the said dangerous part and the hand of the operator, mechanism adapted to hold said gate out of the way of the operator when the said dangerous part is idle, and a spring so disposed as to move the gate to an operative position when released by said holding mechanism.

2. In a stamping machine having dangerous coacting members, the combination of a vertically disposed rigidly constructed safety gate mounted on a member reciprocating in a substantially straight line, with a spring adapted to hold the gate in a position in front of the stamping members, and positively actuated means for holding the gate away from such position when the said dangerous members are not in operation.

3. In a stamping machine, in combination, a frame, coacting stationary and reciprocating stamping members, a vertically disposed safety gate slidably mounted in front of said stamping members, a pivoted lever arm, a coiled spring connected therewith at one end and having the other end fixed, connections between said gate and said lever arm so arranged that the said spring shall tend to hold the gate in front of the stamping members, a cam wheel mounted on said frame, and connections between said cam wheel and said lever arm so disposed as to operate against the resistance of the spring to hold the gate out of operative position while the stamping members are idle.

4. In a stamping machine, in combination, a frame, coacting stamping members mounted thereon, a drive shaft for operating said stamping members, a bracket attached to said frame and having a horizontal slot, a reciprocal slide in said slot, a safety gate mounted on said slide; a bell crank mounted on said bracket, a link connecting one arm of said bell crank with said gate, a coiled spring under tension between the other arm of said bell crank and a portion of said bracket and having a tendency to hold said gate in front of the stamping members, a cam wheel fixed on said shaft, and connections between said cam wheel and said bell crank whereby said cam wheel tends to hold said safety gate away from in front of the stamping members when said stamping members are idle.

5. In a stamping machine, the combination of a frame having a fixed and a reciprocating stamping member, and a revolving shaft adapted to operate said reciprocating stamping member intermittently, with a reciprocating safety gate; a pivoted bell crank having a horizontal and a vertical arm, connections between said gate and the vertical arm of said bell crank, a coiled spring attached to the horizontal arm of said bell crank and tending to hold the said gate in front of the said stamping members, a reciprocating vertical rod connected with said horizontal arm, an upwardly extending link pivotally connected with said rod, a lever pivotally connected at one of its ends with said link and at its opposite end with a fixed pivot on said frame; a roller stud on said lever between its pivoted ends, and a cam wheel fixed upon said shaft and operating upon said stud, said cam wheel being so disposed on the shaft as to hold said lever in a depressed position until the reciprocating stamping member is about to descend and then suddenly to release the said lever.

6. A safety attachment for stamping machines and the like, comprising a bracket adapted to be secured to the front of the machine, said bracket having a downwardly extending arm, a slide mounted on said bracket for horizontal reciprocation, a bell crank lever pivoted on said arm, one arm of said lever being linked to said slide, a gate attached to said slide, a spring tending to move said slide in one direction, and means connected to the other arm of said bell crank for moving said slide in the other direction.

In witness whereof I hereunto affix my signature in the presence of two witnesses.

KONSTANTINE THULANDER.

Witnesses:
  V. B. NELSON,
  E. C. TRANER.